Feb. 12, 1946.   W. G. BURHANS   2,394,895
FILTER
Filed Jan. 23, 1943   3 Sheets-Sheet 1
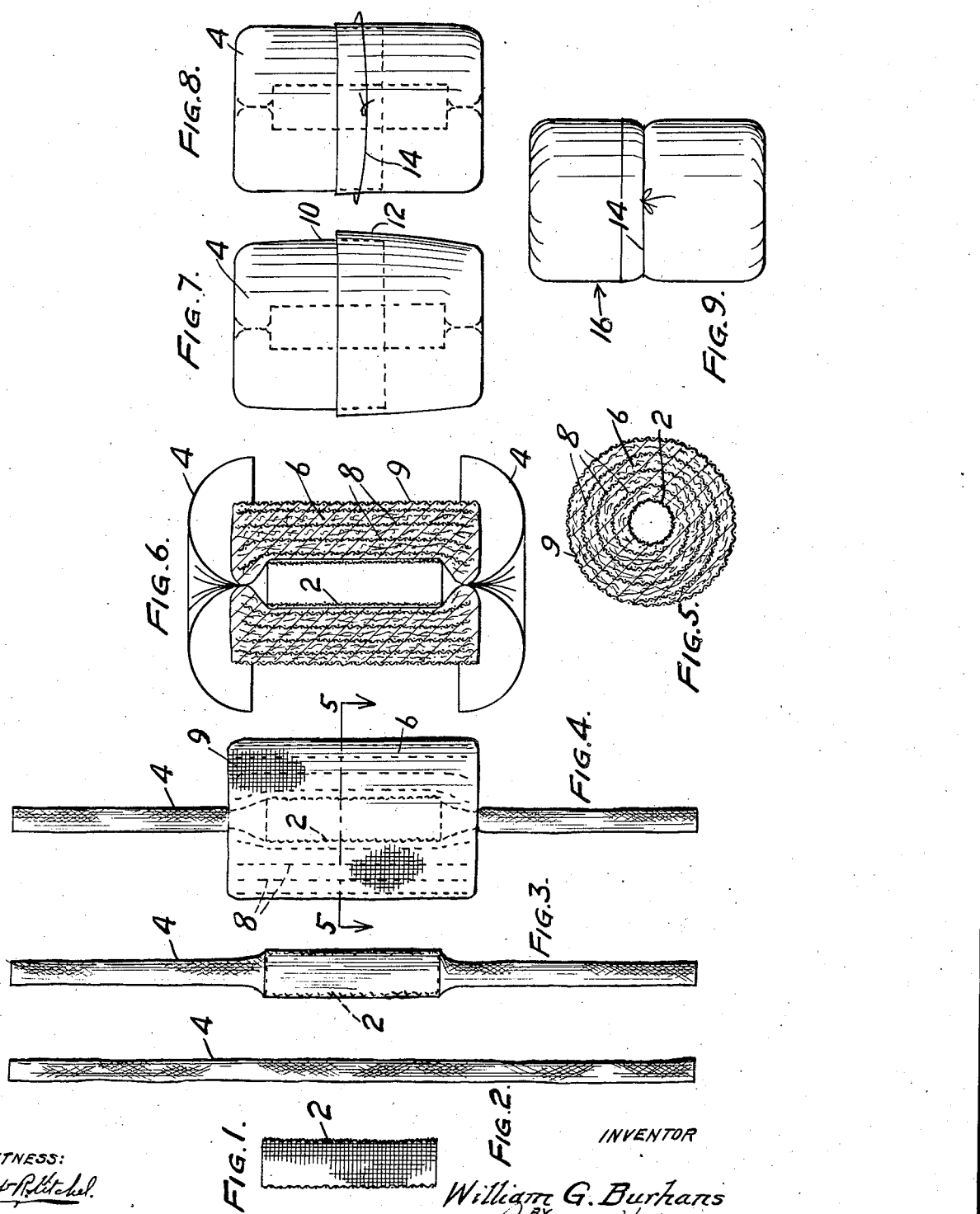
INVENTOR
William G. Burhans
BY
Busser, Harding
ATTORNEYS.
WITNESS:
Robt. R. Mitchel.

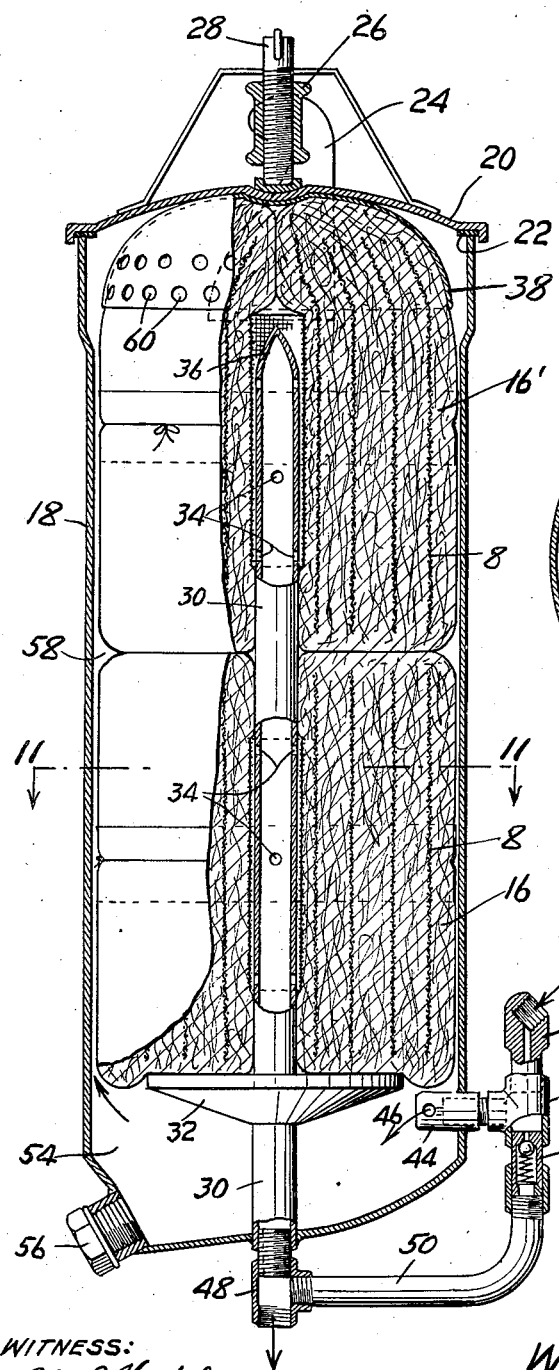
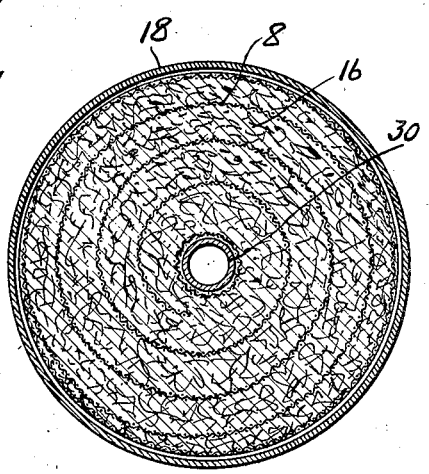
FIG. 11.
FIG. 10.
INVENTOR
William G. Burhans

Feb. 12, 1946. W. G. BURHANS 2,394,895
FILTER
Filed Jan. 23, 1943 3 Sheets-Sheet 3
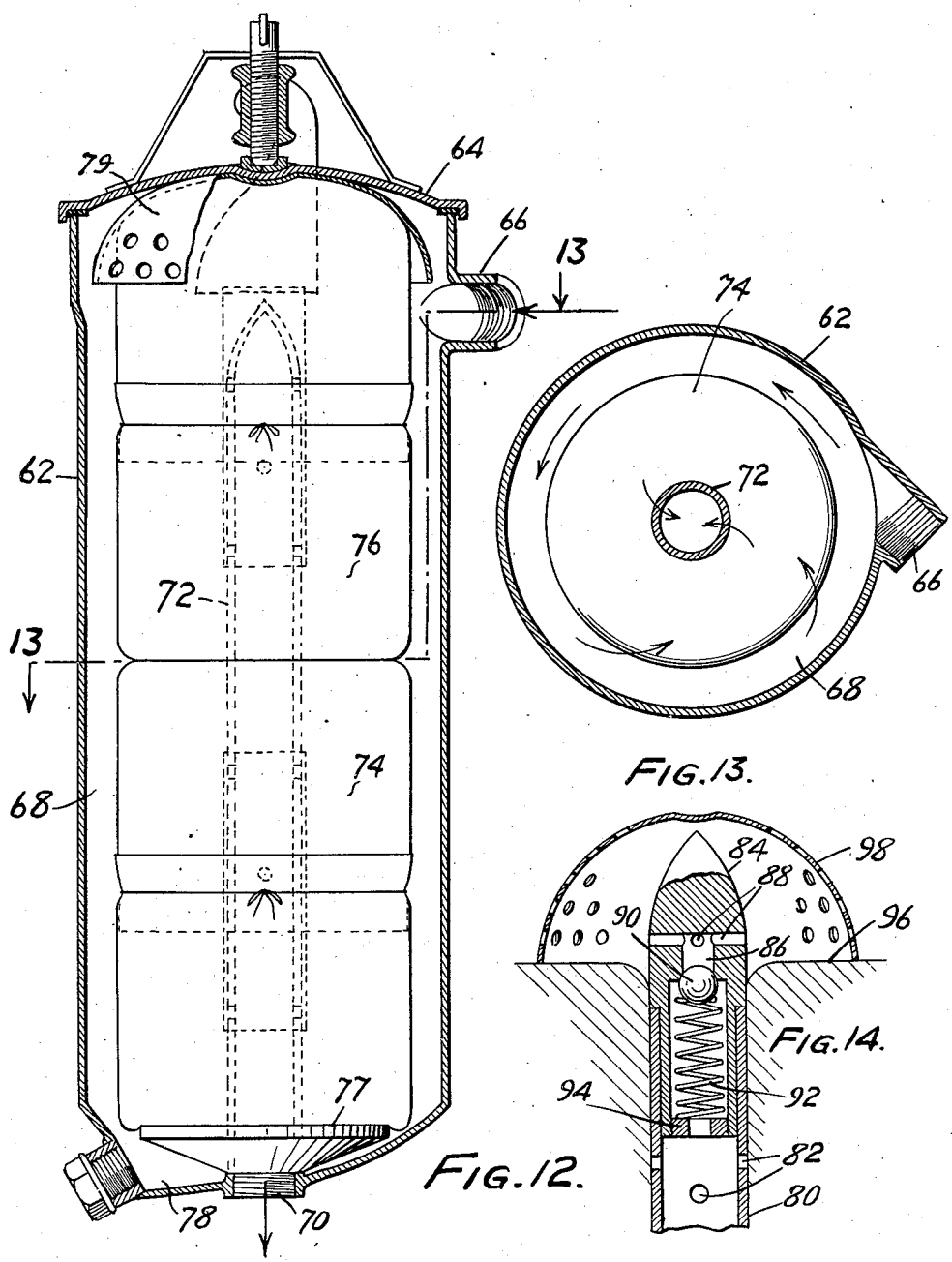

Patented Feb. 12, 1946

2,394,895

UNITED STATES PATENT OFFICE 2,394,895

FILTER

William G. Burhans, Kingston, N. Y.

Application January 23, 1943, Serial No. 473,292

7 Claims. (Cl. 210—134)

This invention relates to filters, and particularly to filters for lubricating or fuel oil or the like adapted to utilize a replaceable cartridge. The invention further relates to cartridges for such filters.

It is the general object of the present invention to provide a filter and cartridges therefor adapted to produce more effective filtering and provide a long period between replacements of filter cartridges. In particular the invention is directed to the provision of filters of large capacity, such as are required in large installations where rather large quantities of lubricating oil are recirculated or where large volumes of fuel oil must be filtered.

Further objects of the invention, particularly relating to details of construction and arrangement of parts, will become apparent from the following description, read in conjunction with the accompanying drawings, in which:

Figures 1 to 9, inclusive, are diagrammatic in nature and illustrate component parts of a filter element and the assembly thereof into the completed filter, the latter being illustrated in Figure 9, these various figures, with the exception of Figures 5 and 6, consisting of elevations, Figure 6 being an axial section, and Figure 5 being a transverse section on the plane indicated at 5—5 in Figure 4;

Figure 10 is a vertical section through a filter particularly adapted for the filtration of lubricating oil and utilizing cartridges of the type illustrated in the preceding figures;

Figure 11 is a transverse section taken on the plane indicated at 11—11 in Figure 10;

Figure 12 is a longitudinal section through a somewhat different form of filter also utilizing the same general type of filter cartridges, but adapted for filtering large volumes of fuel oil or the like;

Figure 13 is a transverse section taken on the broken surface the trace of which is indicated at 13—13 in Figure 12; and Figure 14 is a fragmentary sectional view showing a bypass valve arrangement which may be incorporated in filters in accordance with the present invention.

Referring first to Figures 1 to 9, inclusive, there is illustrated therein the method of forming the improved type of filter. Heretofore it has been customary to make filter cartridges of cotton waste or other fibrous filtering material in a generally cylindrical form, a very satisfactory type comprising a roll of wire mesh and cotton waste enclosed within a woven fabric bag closed by the drawing of the end walls thereof together and desirably having a bottom of wire mesh or the like. Such a cartridge is adapted to be received within a cylindrical housing and is so compressed as to engage tightly the cylindrical wall of said housing, with the result that the liquid to be filtered enters one end of the cartridge and passes from the other. In accordance with the present invention, the flow occurs in different fashion, generally from the outside to the axis of cylindrical cartridges, so that the cartridge must have an arrangement in its interior for carrying off the filtered liquid.

The cartridge is provided with a central tube of wire mesh or the equivalent, indicated at 2 in Figure 1. This tube may consist of a single convolution of wire mesh or several turns thereof, or may comprise such an element as a metal or fiber tube containing suitable perforations. As will be evident hereafter, it should be of moderate rigidity so as to provide a more or less well-defined opening in the interior of the cartridge. It is not essential, however, that in either initial or final form it should be perfectly circular in cross-section, inasmuch as when the cartridge is put in use, the interior will be opened up by reason of the presence of a tube over which the cartridge is located. Over this foraminous tube 2 there is drawn a knit tube, 4, considerably longer than the tube 2, and knit in such fashion as to be substantially expandible. A knitted tube is most desirable for this purpose because of its expandibility, though it will be evident that by making it in sections, it is possible that some or all of it may equally well be of knitted fabric or of another material adapted to conform to the interior contents of the cartridge to form a final cartridge having generally the form hereafter indicated. The assembly of the wire mesh or similar tube 2 with the knitted tube is indicated in Figure 3.

About this assembly, there is then wound wire mesh or the like in the form of convolutions with interposed fibrous filtering material. If, for example, wire mesh is used as indicated at 8, it may be initially laid out flat and cotton waste or some other suitable filtering material laid thereon, whereupon the combination is rolled up over the outside of the tube 2 covered by the knitted tube 4. If wire mesh is thus used, it is desirable that the intermediate product indicated in Figure 4 shall be completely surrounded by wire mesh, as indicated at 9, the last turn of which should be substantially free of the filtering material, thus giving body and substantial rigidity to the resulting inner portion of the cartridge.

At the stage indicated in Figure 4, it will be noted that the filtering material and spiral wire mesh extend axially substantially beyond the ends of the tube 2. As will become evident hereafter, this is very desirable and important to secure effective sealing against short circuit of the liquid flow. The winding is preferably done quite tightly, with the result, even at this stage, of inward extension of the ends of the filtering material over the ends of the tube 2 to tend to pinch the portions of the knitted tube 4 extending therethrough.

In place of wire mesh, the spiral may comprise perforated sheet metal, stiff perforated paper, fiber or the like, or blotting paper, all capable of imparting substantial axial rigidity to the cartridge to prevent its collapse under axially applied pressure. However, such stiffening material may be omitted if sufficient clearance is provided in the housing to prevent improper cutting off of flow.

The projecting ends of the knitted tube 4 are now extended and drawn over the ends of the convolutions of the wire mesh, or equivalent perforated metal, stiffened cloth or the like, to bring the two ends, as indicated at 10 and 12 in Figure 7, into overlapping relationship in the vicinity of the knit portion of the cartridge. Thereafter, a wire or cord, indicated at 14, is drawn tightly about the overlapping ends of the knitted material to secure the final cartridge indicated at 16. Desirably the ends of the knitted material are drawn tightly about the filtering material, thereby tending to compress the same and cause the end portions thereof to extend over the ends of the tube 2.

The use of the type of cartridge just described and the improved form of filter embodying the same is illustrated in Figures 10 and 11. A casing 18, which may be of cylindrical or other shape, since it need not conform to the cross-section of the cartridge, is provided with a top 20 arranged to close its upper end through the medium of an interposed gasket 22, the top being tightly held in closed position by engagement of a crossbar 26 with hook members 24 secured to the body 18 of the filter and carrying a screw 28, which may be caused to bear very tightly against the top 20. This closure arrangement is conventional in oil filters and need not be described in greater detail.

Extending through and secured to the bottom of the casing 18 is a tube 30, which carries a conical flange 32 having its concave surface directed upwardly. The portion of the tube 30 extending above this flange is provided with openings 34, arranged, as will be evident hereafter, to be located within the axial confines of respective cylinders 2 of two cartridges. While not essential, the upper end of this tube is desirably tapered, as indicated at 36, to facilitate the location of cartridges 16 and 16' thereon. Within the top member 20 and carried thereby there is a cap 38 perforated as indicated at 60, and arranged to embrace the upper end of the uppermost cartridge 16'.

The liquid to be filtered is fed to the connection indicated at 40, which delivers it into a T 42 connected to the inlet member 44 provided with a restricted opening 46. The outlet connection 48 is made to the central tube 30 and is connected to the T 42 by means of a bypass tube 50 and a check valve 52, normally held in closed position by a spring to prevent the passage of liquid through the bypass, but adapted to yield in the event that clogging of the filter takes place so that cutting off of the liquid flow cannot occur.

The lower end of the casing 18 below the flange 32 provides a sump 54 from which sediment may be periodically drained through the plug 56.

The two cartridges 16 and 16', which may be of identical construction and of the type previously described, are slipped over the central tube 30. In the case of larger filters, more than two such cartridges may be provided; or, in small filters, only one may be used. Thereupon the closure is put on the casing and tightened, with the result that substantial axial compression is imparted to the filters. The wire mesh or similar tubes 2 are arranged to embrace loosely the tube 30 providing interior spaces arranged to receive the filtered liquid which thereupon will escape through the openings 34 into the interior of the tube 30. Wire mesh insures a free flow of the filtered liquid about extended portions of the tube 30 which contain the openings 34. Beyond the ends of these tubes, however, the axial compression of the cartridges as well as the pressure exerted by the liquid being filtered, will cause the filtered material to engage very tightly the tube 32 or, above the upper end of the tube 32 to provide a closure over the end of the tube 2 as indicated. It will thus be evident that the entering liquid passing from the sump 54 upwardly into the space around the cartridges and into their exterior surfaces, as well as through the openings 60 thereinto will find no free passage to the tube 30 except through the cartridges into the spaces within the tubes 2 thereof. The result is that complete filtering will occur with no possible bypassing of unfiltered liquid. It will be evident, furthermore, that exposed to the liquid for filtration is substantially the entire cylindrical wall of each cartridge as well as substantial portions of the ends beyond the edge of the flange 32 and in the vicinity of the openings 60 in the cap 38. In the case of cylindrical cartridges heretofore provided, only one end of the surface of the cartridge was usually exposed to the inflowing liquid, or at most, in addition to such end, only a portion of the cylindrical walls. Since a cartridge loses its effectiveness by reason of the clogging of the portion of the surface through which the liquid enters, it will be evident that for a given volume of cartridge, the present arrangement offers a substantially longer life by reason of the increased surface exposed to the entering flow.

The tube 30 is desirably provided with no openings in the region between the adjacent ends of the tubes 2 of the two cartridges, since in this location the cartridges bear tightly against the tube and the openings would be relatively ineffective to promote the passage of liquid. However, such openings may be provided if desired.

While the flange 32 may be flat, it is desirably of conical shape, concave upward, since under such circumstances the axial pressure tends to create a radially inward pressure to bind the lower portion of the cartridge against the tube 30.

The filter just described is particularly adapted to the filtration of lubricating oil which, even for large engines, involves relatively small volume of flow. In such cases, it is desirable that the filtering material be tightly packed, and accordingly the cartridges are wound and formed under substantial compression. In the case of the filtration of fuel oil or the like, however, for example for delivery to ordinary burner supply tanks or Diesel engine tanks or the like, the flow must be quite free and the filter must be capable of handling large volumes of flow. A filter particularly designed for such purposes is illustrated in Figures 12 and 13.

This last filter comprises a casing 62 provided with a closure indicated at 64. The liquid to be filtered in this case desirably enters tangentially at 66, so that it will swirl about the cartridges within the substantial clearance space between them and the casing wall. The cartridges in this case are indicated at 74 and 76, and are located upon a central tube 72 similar to the tube 30 previously described, compression taking place between the lower conical member 77 and the perforated top cap 79. Delivery from the central tube takes place through its lower end 70. A sump 78 is provided to receive the heavy sediment separated from the oil, in part by the centrifugal action due to its swirling motion in the space exterior to the cartridges.

The essential difference between this filter and the one previously described is merely in the matter of clearance spaces and provision for the swirling action which can occur in the case of a low viscosity fluid. It will be noted that the central tube 72 is of relatively large diameter to take care of the larger volume of flow, and the same is true of the central foraminous cylinders in the interior of the cartridges.

The cartridges may be essentially the same as heretofore described, though preferably the filtering material is in this case more loosely arranged so that flow may take place more freely.

In Fig. 14 there is illustrated a bypass valve arrangement which may be embodied in the filter of Figure 12, or in that of Figure 10 replacing the external bypass arrangement therein illustrated. In accordance with this phase of the invention, the central tube 80, corresponding to either of tubes 30 or 72, and perforated at 82, is capped by an assembly comprising a body 84 having an opening 86 communicating with passages 88, the opening 86 being normally closed by the seating of a ball valve 90 under the action of spring 92 reacting between it and a perforated plug 94. When this arrangement is used the top 96 of the upper cartridge, or of a single cartridge if but one is used, is held below the passages 88 by a cap member 98 which bears upon the top of the cartridge, replacing caps such as 38 and 79. It will be clear that normally the action of the filter is the same as that of those previously described, valve 90 being closed. In case of clogging, however, the rise of pressure will open valve 90, permitting bypass to the interior of tube 80.

What I claim and desire to protect by Letters Patent is:

1. A filter cartridge comprising a tubular core member having perforations in its longitudinal walls and having substantial axial rigidity, a substantially elastic fabric cover therefor, filtering material surrounding said core member and its cover, said filtering material comprising a foraminous spirally arranged member having substantial axial rigidity and fibrous filtering material between the convolutions of said member spirally arranged, said fabric cover of said core being extended about said filtering material to constitute an outer cover therefor, and means for holding said cover in position, said filtering material extending inwardly over the ends of said tubular core member throughout a substantial axial distance at each of said ends.

2. A filter cartridge comprising a tubular core member having perforations in its longitudinal walls and having substantial axial rigidity, a fabric cover therefor, filtering material surrounding said core member and its cover, said filtering material comprising a foraminous spirally arranged member having substantial axial rigidity and fibrous filtering material between the convolutions of said spirally arranged member, said fabric cover of said core being extended about said filtering material to constitute an outer cover therefor, and means for holding said cover in position, said filtering material extending inwardly over ends of said tubular core member throughout a substantial axial distance at each of said ends.

3. A filter cartridge comprising a tubular core member having perforations in its longitudinal walls and having substantial axial rigidity, and filtering material surrounding said core member, said filtering material comprising a foraminous spirally arranged member having substantial axial rigidity and fibrous filtering material between the convolutions of said spirally arranged member, said filtering material extending inwardly over the ends of said tubular member throughout a substantial axial distance at each of said ends.

4. A filter cartridge comprising a tubular core member having perforations in its longitudinal walls and having substantial axial rigidity, and filtering material surrounding said core member, said filtering material comprising a foraminous spirally arranged member having substantial axial rigidity and fibrous filtering material between the convolutions of said spirally arranged member, and a cover for said filtering material extending inwardly over the ends of said tubular member throughout a substantial axial distance at each of said ends.

5. A filter cartridge comprising a tubular core member having perforations in its longitudinal walls and having substantial axial rigidity, a fabric cover therefor, filtering material surrounding said core member and its cover, said filtering material comprising a foraminous spirally arranged member having substantial axial rigidity and fibrous filtering material between the convolutions of said spirally arranged member, said fabric cover of said core being extended from both ends of said filtering material about the same to form overlapping skirts constituting an outer cover therefor, and means binding said skirts in overlapping relationship, said filtering material extending inwardly over ends of said tubular core member throughout a substantial axial distance at each of said ends.

6. A filter comprising a cylindrical housing having an inlet passage, and an outlet passage in the form of an axially extending perforated tube having a substantially smooth outer surface, and a plurality of filter cartridges embracing said tube, the filtering materials of said cartridges being in contact with each other and in fluid-tight engagement with the tube to close the region of contact against passage of liquid without filtration, each of said cartridges having a foraminous tubular core fitting over said tube and surrounded by filtering material extending over the ends of said core into substantial sealing engagement with said tube, means for subjecting said cartridges to axial pressure to provide said contact with each other and with said tube, said inlet passage communicating with a space between the cartridges and the cylindrical wall of said housing so that flow takes place from said space through the filtering material and openings in said cores into the tube forming the outlet passage.

7. A filter comprising a cylindrical housing having an inlet passage, and an outlet passage in the form of an axially extending perforated tube closed at its upper end, and a plurality of filter cartridges embracing said tube, the filtering materials of said cartridges being in contact with each other and in fluid-tight engagement with the tube to close the region of contact against passage of liquid without filtration, each of said cartridges having a foraminous tubular core fitting over said tube and surrounded by filtering material extending over the ends of said core into substantial sealing engagement with said tube, said inlet passage communicating with a space between the cartridges and the cylindrical wall of said housing so that flow takes place from said space through the filtering material and openings in said cores into the tube forming the outlet passage, said casing being constructed and arranged to subject said filter cartridges to axial compression and contact with each other.

WILLIAM G. BURHANS.